United States Patent
Antczak et al.

(10) Patent No.: US 8,341,538 B1
(45) Date of Patent: Dec. 25, 2012

(54) SYSTEMS AND METHODS FOR REDUCING REDUNDANCIES IN QUALITY-ASSURANCE REVIEWS OF GRAPHICAL USER INTERFACES

(75) Inventors: Michal Antczak, Warsaw (PL); Rafal Boczarski, Warsaw (PL); Tomasz Lubiankowski, Warsaw (PL); Malgorzata Kurek, Warsaw (PL)

(73) Assignee: Symantec Corporation, Mountain View, CA (US)

( * ) Notice: Subject to any disclaimer, the term of this patent is extended or adjusted under 35 U.S.C. 154(b) by 583 days.

(21) Appl. No.: 12/480,946

(22) Filed: Jun. 9, 2009

(51) Int. Cl.
*G06F 3/048* (2006.01)
(52) U.S. Cl. ......................... 715/764; 715/767
(58) Field of Classification Search .................. 715/205, 715/708, 764; 713/187–189, 194; 726/22–24
See application file for complete search history.

(56) References Cited

U.S. PATENT DOCUMENTS

| | | | |
|---|---|---|---|
| 7,603,344 B2 * | 10/2009 | Bousquet et al. | 713/179 |
| 2008/0162478 A1 * | 7/2008 | Pugh et al. | 707/6 |
| 2009/0018990 A1 * | 1/2009 | Moraleda | 707/2 |

OTHER PUBLICATIONS

Perceptual Image Diff; http://pdiff.sourceforge.net/, as accessed on Mar. 24, 2009.

* cited by examiner

*Primary Examiner* — Weilun Lo
*Assistant Examiner* — Truc Chuong
(74) *Attorney, Agent, or Firm* — Advantedge Law Group

(57) ABSTRACT

A computer-implemented method for reducing redundancies in quality-assurance reviews of graphical user interfaces may include identifying a plurality of screenshots of a graphical user interface. The computer-implemented method may also include creating, for each screenshot within the plurality of screenshots, a fingerprint of the screenshot and a fingerprint of a set of text contained within the screenshot. The computer-implemented method may further include performing a consolidation operation that identifies, by comparing each screenshot fingerprint and comparing each text fingerprint, redundant screenshots and/or redundant sets of text. The computer-implemented method may additionally include displaying non-redundant screenshots and/or non-redundant sets of text. Various other methods, systems, and computer-readable media are also disclosed.

19 Claims, 8 Drawing Sheets

SYSTEMS AND METHODS FOR REDUCING REDUNDANCIES IN QUALITY-ASSURANCE REVIEWS OF GRAPHICAL USER INTERFACES

BACKGROUND

The software industry's low barrier to entry facilitates strong competition in the marketplace between software development companies. In order to be successful, most software development companies strive to produce high-quality and error-free software. Because the user interface of a software application is typically the most visible aspect of a software application, software development companies may devote significant resources to performing thorough quality-assurance reviews of user interfaces.

Unfortunately, a thorough quality-assurance review of a software application's user interface may be expensive, requiring many man-hours to review each aspect of the user interface in its various states. In order to increase both the efficiency and thoroughness of a quality-assurance review of a user interface, some software development companies may use a partially automated review process. For example, a quality assurance tool may automatically interact with the user interface, guiding the user interface through its various states. The quality assurance tool may further capture a screenshot of the user interface at each step of the interaction, so that a quality assurance employee or other user may inspect the user interface at that step to find any display glitches, errors, or other defects.

However, this partially automated review process may still be inefficient. For example, some of the screenshots of a user interface in its various stages may be identical, such that a review of more than one of these screenshots may be redundant. Similarly, some elements of the screenshots of the user interface (e.g., text contained within the screenshot) may be identical, such that quality-assurance reviews targeting those elements may also include redundancies. As such, the instant disclosure identifies a need for reducing the redundancies present in conventional quality-assurance reviews of graphical user interfaces.

SUMMARY

The instant disclosure generally relates to systems and methods for reducing redundancies in quality-assurance reviews of graphical user interfaces. As will be described in greater detail below, some embodiments disclosed herein may process screenshots of graphical user interfaces to enable quality assurance engineers and linguistic reviewers to review graphical user interfaces with minimal duplicative work.

For example, a consolidation module may gather or identify screenshots of each state of a graphical user interface. For each screenshot, the consolidation module may create both: 1) a fingerprint of the screenshot (e.g., a cryptographic hash of the screenshot) and 2) a fingerprint of text contained within the screenshot (e.g., a cryptographic hash of the text contained within the screenshot). The consolidation module may then identify redundant screenshots and/or redundant sets of text within the various screenshots of the user interface by: 1) comparing the screenshot fingerprints with each other and 2) comparing the text fingerprints with each other.

Upon identifying this redundant information, a display module may then display: 1) non-redundant screenshots to quality assurance engineers tasked with reviewing the user interface for cosmetic or functional issues and 2) screenshots that are textually non-redundant to linguistic reviewers tasked with reviewing the user interface for textual errors, such as spelling or translation errors. Thus, by identifying visual and/or textual redundancies present in a graphical user interface and only presenting non-redundant information for review, the systems and methods disclosed herein may greatly reduce both the cost and time required to perform a thorough quality-assurance review of a user interface.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
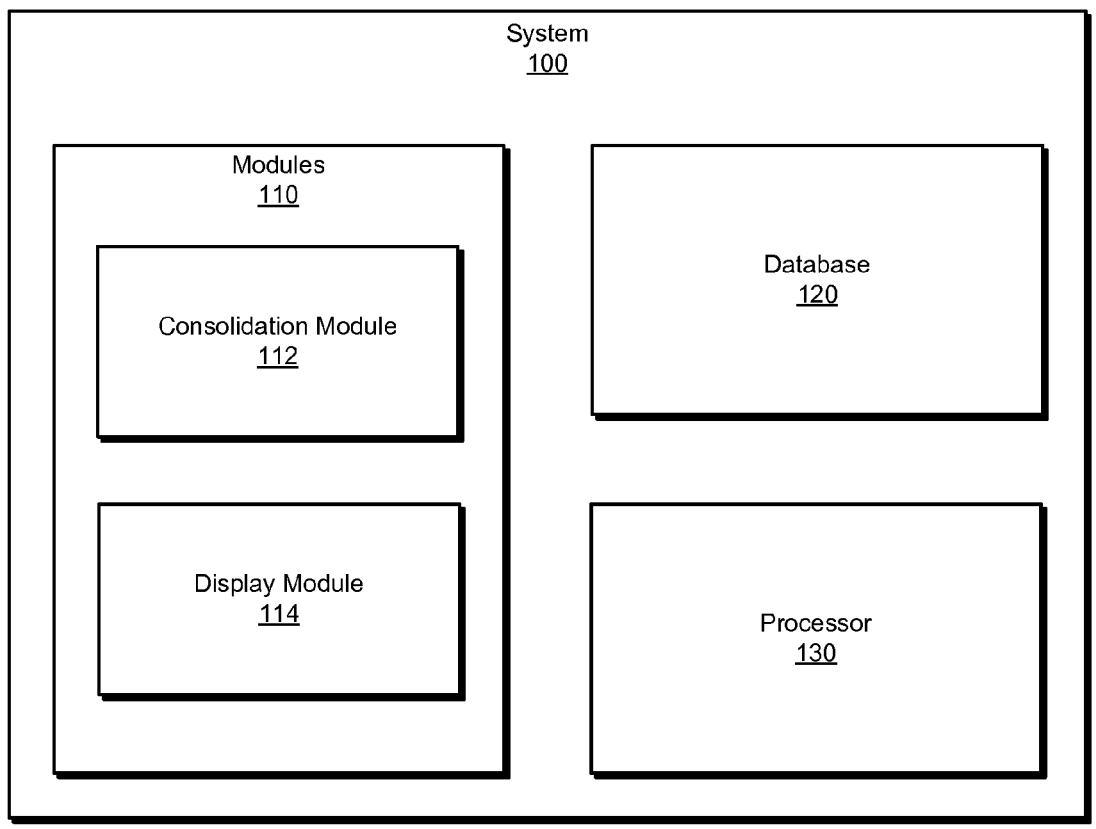
FIG. 1 is a block diagram of an exemplary system for reducing redundancies in quality-assurance reviews of graphical user interfaces.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
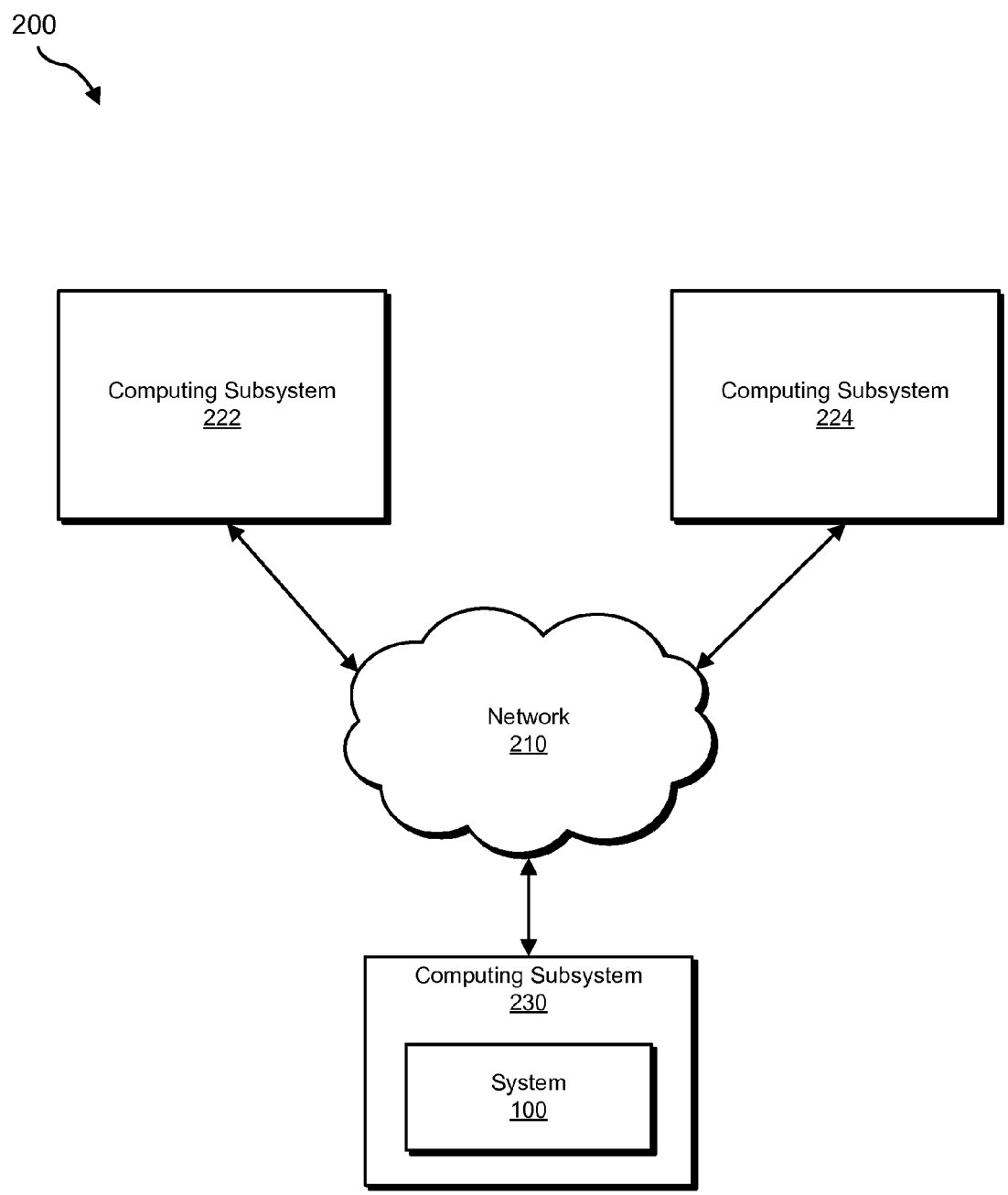
FIG. 2 is a block diagram of an exemplary system for reducing redundancies in quality-assurance reviews of graphical user interfaces according to an additional embodiment.

The following will provide, with reference to FIGS. 1-2, detailed descriptions of exemplary systems for reducing redundancies in quality-assurance reviews of graphical user interfaces. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for reducing redundancies in quality-assurance reviews of graphical user interfaces. As illustrated in this figure, exemplary system 100 may comprise one or more modules 110 for performing one or more tasks. For example, and as will be explained in greater detail below, exemplary system 100 may comprise a consolidation module 112 programmed to consolidate screenshots of a graphical user interface, as well as sets of text contained within the screenshots, by identifying redundant screenshots and/or redundant sets of text. Exemplary system 100 may also comprise a display module 114 programmed to display non-redundant screenshots and/or non-redundant sets of text. Although illustrated as separate elements, one or more of modules 110 in FIG. 1 may represent portions of a single module or application.

In certain embodiments, one or more of modules 110 in FIG. 1 may represent one or more software applications or programs that, when executed by a computing device, may cause the computing device to perform one or more tasks. For example, as will be described in greater detail below, one or more of modules 110 may represent software modules stored and configured to run on one or more computing devices, such as the devices illustrated in FIG. 2 (e.g., computing subsystem 222, computing subsystem 224, and/or computing subsystem 230), computing system 710 in FIG. 7, and/or portions of exemplary network architecture 800 in FIG. 8. One or more of modules 110 in FIG. 1 may also represent all or portions of one or more special-purpose computers configured to perform one or more tasks.

As illustrated in FIG. 1, exemplary system 100 may also comprise a database 120. Database 120 may represent portions of a single database or computing device or a plurality of databases or computing devices. As will be explained in greater detail below, database 120 may store screenshots, sets of text extracted from the screenshots, and/or information that identifies redundant screenshots and/or sets of text.

Database 120 in FIG. 1 may represent a portion of one or more computing devices. For example, database 120 may represent a portion of computing subsystems 222, 224, and/or 230 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as computing subsystems 222, 224, and/or 230 in FIG. 2, computing system 710 in FIG. 7, and/or portions of exemplary network architecture 800 in FIG. 8.

As seen in FIG. 1, system 100 may also comprise a processor 130. Processor 130 generally represents any type or form of processing unit capable of processing data or interpreting and executing instructions. Processor 130 may include one or more mircoprocessors or central processing units configured to execute one or more of modules 110. In one example, processor 130 may be configured to execute one or more of modules 110.

System 100 in FIG. 1 may be implemented or deployed in a variety of ways. In one example, system 100 may represent a portion of an exemplary system 200 in FIG. 2. As illustrated in this figure, exemplary system 200 may comprise a computing subsystem 222 and a computing subsystem 224 in communication with a computing subsystem 230 via a network 210. In one example, and as will be explained in greater detail below, system 100 may cause computing subsystem 230 to: 1) gather or identify screenshots of a graphical user interface, 2) create, for each screenshot, a fingerprint of the screenshot and a fingerprint of a set of text contained within the screenshot, and 3) perform a consolidation operation that identifies redundant screenshots and/or redundant sets of text.

Similarly, and as will be described in greater detail below, computing subsystems 222, 224, and/or 230 may be programmed to display non-redundant screenshots and/or sets of text. For example, in one embodiment computing subsystem 230 may be programmed with one or more modules (such as consolidation module 112 and display module 114 in FIG. 1) to display non-redundant screenshots to a user of computing subsystem 230 (e.g., a quality assurance engineer tasked with reviewing the user interface for cosmetic or functional issues). In contrast, computing subsystem 224 may be programmed with one or more modules (such as consolidation module 112 and display module 114) to display non-redundant sets of text to a user of computing subsystem 224 (e.g., a linguistic reviewer tasked with reviewing the user interface for spelling, grammar, translation, or other textual errors).

Computing subsystems 222, 224, and 230 generally represent any type or form of computing device capable of reading computer-executable instructions. Examples of computing subsystems 222, 224, and 230 include, without limitation, laptops, desktops, servers, cellular phones, personal digital assistants (PDAs), multimedia players, embedded systems, combinations of one or more of the same, exemplary computing system 710 in FIG. 7, or any other suitable computing device.

Network 210 generally represents any medium or architecture capable of facilitating communication or data transfer. Examples of network 210 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 210 may facilitate communication or data transfer using wireless or wired connections. In one embodiment, network 210 may facilitate communication between computing subsystem 230 and computing subsystems 222 and 224.

Figure 3:
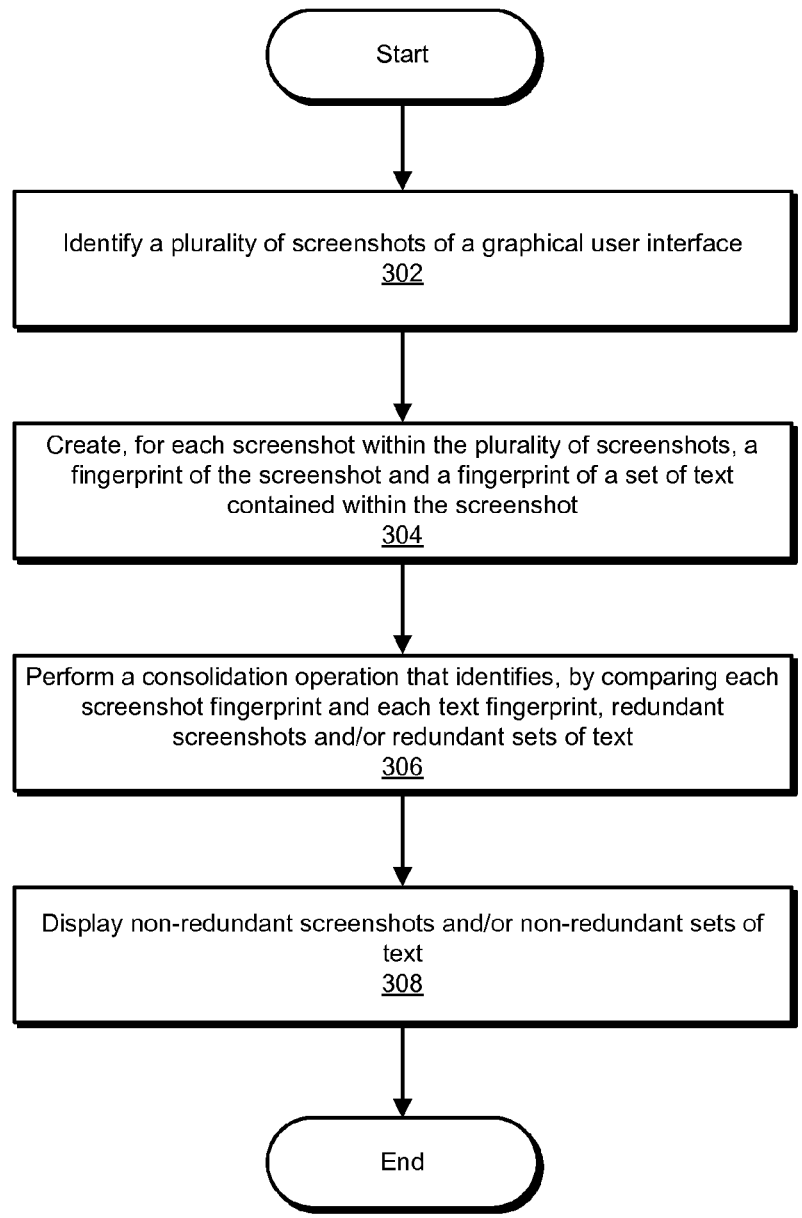
FIG. 3 is a flow diagram of an exemplary method for reducing redundancies in quality-assurance reviews of graphical user interfaces.

FIG. 3 is a flow diagram of an exemplary computer-implemented method 300 for reducing redundancies in quality-assurance reviews of graphical user interfaces. As illustrated in this figure, at step 302 the system may identify a plurality of screenshots of a graphical user interface. For example, consolidation module 112 in FIG. 1 (which may, as mentioned above, be stored and configured to run on computing subsystem 230) may gather or identify screenshots of each state of a graphical user interface on computing subsystem 230.

Consolidation module 112 may perform step 302 in any suitable manner. For example, consolidation module 112 may identify the screenshots by retrieving the screenshots from a database, such as database 120. In other examples, consolidation module 112 may identify the screenshots by creating the screenshots.

For example, consolidation module 112 may capture the screenshots from an operating environment (such as MICROSOFT WINDOWS) associated with the graphical user interface. In this example, consolidation module 112 may test the graphical user interface of the application by interacting with the graphical user interface to cause the graphical user interface to arrive at various possible states. Consolidation module 112 may then capture a screenshot of each state of the graphical user interface.

In addition to capturing the plurality of screenshots from the operating environment, consolidation module 112 may collect a set of text from each screenshot. A set of text for a screenshot may include all or only a portion of text within the screenshot. For example, in some embodiments the set of text collected may include all textual elements of the graphical user interface (e.g., control captions, static text, etc.). In other embodiments, the set of text may include only visible and/or readable text (e.g., text that excludes passwords masked with wildcard characters). In some embodiments, the set of text may exclude user-entered text.

Consolidation module 112 may collect a set of text for a screenshot in any number of ways. For example, consolidation module 112 may collect the set of text from the operating environment (e.g., by collecting the set of text from one or more data structures in the operating environment that may be used to render the graphical user interface). In another example, consolidation module 112 may extract the set of text from the screenshot by applying an optical character recognition method to the screenshot.

In some embodiments, consolidation module 112 may store the captured screenshot and the corresponding set of text together in a database, such as database 120 in FIG. 1. In other embodiments, consolidation module 112 may store references (e.g., file paths) to the captured screenshot and the set of text in the database. In certain embodiments, consolidation module 112 may store only the reference to the screenshot in database 120 (i.e., without storing a reference to the set of text in database 120).

Returning to FIG. 3, at step 304 consolidation module 112 may create both: 1) a fingerprint of each screenshot in the plurality of screenshots and 2) a fingerprint of the set of text contained within the screenshot. A fingerprint in this context may be any data string designed to uniquely identify another data string. For example, consolidation module 112 may create a fingerprint of a screenshot (or "screenshot fingerprint") by using a bit stream of the screenshot as input for a cryptographic hash function (such as MD5 or SHA1), with the result of the function constituting the fingerprint. Likewise, consolidation module 112 may create a fingerprint of the corresponding set of text (or "text fingerprint") by using the set of text as input for a cryptographic hash function.

After creating the screenshot fingerprints and the text fingerprints, at step 306 consolidation module 112 may perform a consolidation operation. The consolidation operation may include comparing each screenshot fingerprint to identify any redundant screenshots and comparing each text fingerprint to identify any redundant sets of text.

As used herein, a "redundant screenshot" may refer to any screenshot in a group of identical screenshots, save one. In other words, in a group of identical screenshots, a first screenshot may represent a "non-redundant screenshot," while the remaining screenshots may represent redundant screenshots. Likewise, a "redundant set of text" may refer to any set of text in a group of identical sets of text, save for one "non-redundant set of text."

The system may identify redundant screenshots in a variety of ways. In one example, consolidation module 112 in FIG. 1 may identify redundant screenshots by: 1) identifying a first screenshot fingerprint corresponding to a first screenshot within the plurality of screenshots, 2) identifying one or more additional screenshot fingerprints corresponding to additional screenshots within the plurality of screenshots, and then 3) determining that the first screenshot fingerprint is identical to the additional screenshot fingerprints. In some embodiments, the consolidation operation may further include marking the additional screenshots as redundant.

The consolidation operation may mark the additional screenshots as redundant in a variety of ways. For example, the consolidation operation may mark an additional screenshot as redundant by marking a field, in a database record associated with the additional screenshot, that indicates that the additional screenshot is redundant. Alternatively, the consolidation operation may mark the additional screenshot as redundant by marking the additional screenshot for removal from a database. In some examples, the consolidation operation may mark the additional screenshot as redundant by creating a reference to the first screenshot in the database record of the additional screenshot.

Similarly, since identical screenshots may contain identical sets of text, the consolidation operation may further create, in the database record of the additional screenshot, a reference to a set of text contained within the first screenshot. As part of marking the additional screenshot redundant, the consolidation operation may also exclude the additional screenshot fingerprint from further comparisons. In some embodiments, fingerprints for two screenshots may be identical while fingerprints for the corresponding sets of text may differ (as described above, some text may be hidden; thus the images may be identical if only hidden text differs). In this example, the consolidation operation may nevertheless mark one of the sets of text as redundant.

Returning to step 306, the system may identify redundant sets of text in a variety of ways. In one example, consolidation module 112 in FIG. 1 may identify redundant sets of text by: 1) identifying a first text fingerprint corresponding to a set of text contained within a first screenshot within the plurality of screenshots, 2) identifying at least one additional text fingerprint corresponding to a set of text contained within an additional screenshot within the plurality of screenshots, and then 3) determining that the first text fingerprint is identical to the additional text fingerprint. In some embodiments, the consolidation operation may further include marking the additional screenshot as redundant.

The consolidation operation may mark the set of text contained within the additional screenshot as redundant in a variety of ways. For example, the consolidation operation may mark the set of text contained within the additional screenshot as redundant by marking a field, in a database record of the additional screenshot, that indicates that the set of text contained within the additional screenshot is redundant. In some examples, the consolidation operation may mark the set of text contained within the additional screenshot as redundant by creating a reference to the first screenshot (or the set of text contained within the first screenshot) in the database record of the additional screenshot. As part of marking the set of text contained within the additional screenshot as redundant, the consolidation operation may also exclude the additional text fingerprint from further comparisons.

Returning to FIG. 3, at step 308 display module 114 may display non-redundant screenshots and/or non-redundant sets of text. More specifically, in some embodiments display module 114 may display non-redundant screenshots to at least one user (such as a quality-assurance engineer) tasked with identifying any cosmetic errors and/or any functional errors within the graphical user interface. Similarly, display module 114 may display non-redundant sets of text to at least one user (such as a linguistic reviewer) tasked with identifying any: 1) spelling errors, 2) grammatical errors, 3) semantic errors, and/or 4) translation errors within the graphical user interface. Upon completion of step 308, exemplary method 300 may terminate.

Display module 114 may display a non-redundant set of text in isolation or in the context of a screenshot that corresponds to the non-redundant set of text. In other words, in some embodiments display module 114 may display the non-redundant set of text by displaying the screenshot containing the redundant set of text. In other embodiments, display module 114 may display the non-redundant set in a separate window or application.

In some embodiments, display module 114 may identify the non-redundant screenshots by analyzing database records associated with the plurality of screenshots. For example, as discussed earlier, in some embodiments consolidation module 112 may mark a screenshot as redundant by creating a reference, in a database record corresponding to the screenshot, to an identical, non-redundant screenshot. In this example, display module 114 may identify a non-redundant screenshot by locating a database record of a screenshot that does not reference another screenshot.

Display module 114 may also identify the non-redundant sets of text by analyzing database records associated with the plurality of screenshots. For example, display module 114 may identify a non-redundant screenshot by locating a database record associated with a screenshot that does not contain a reference to a set of text corresponding to another screenshot.

Figure 4:
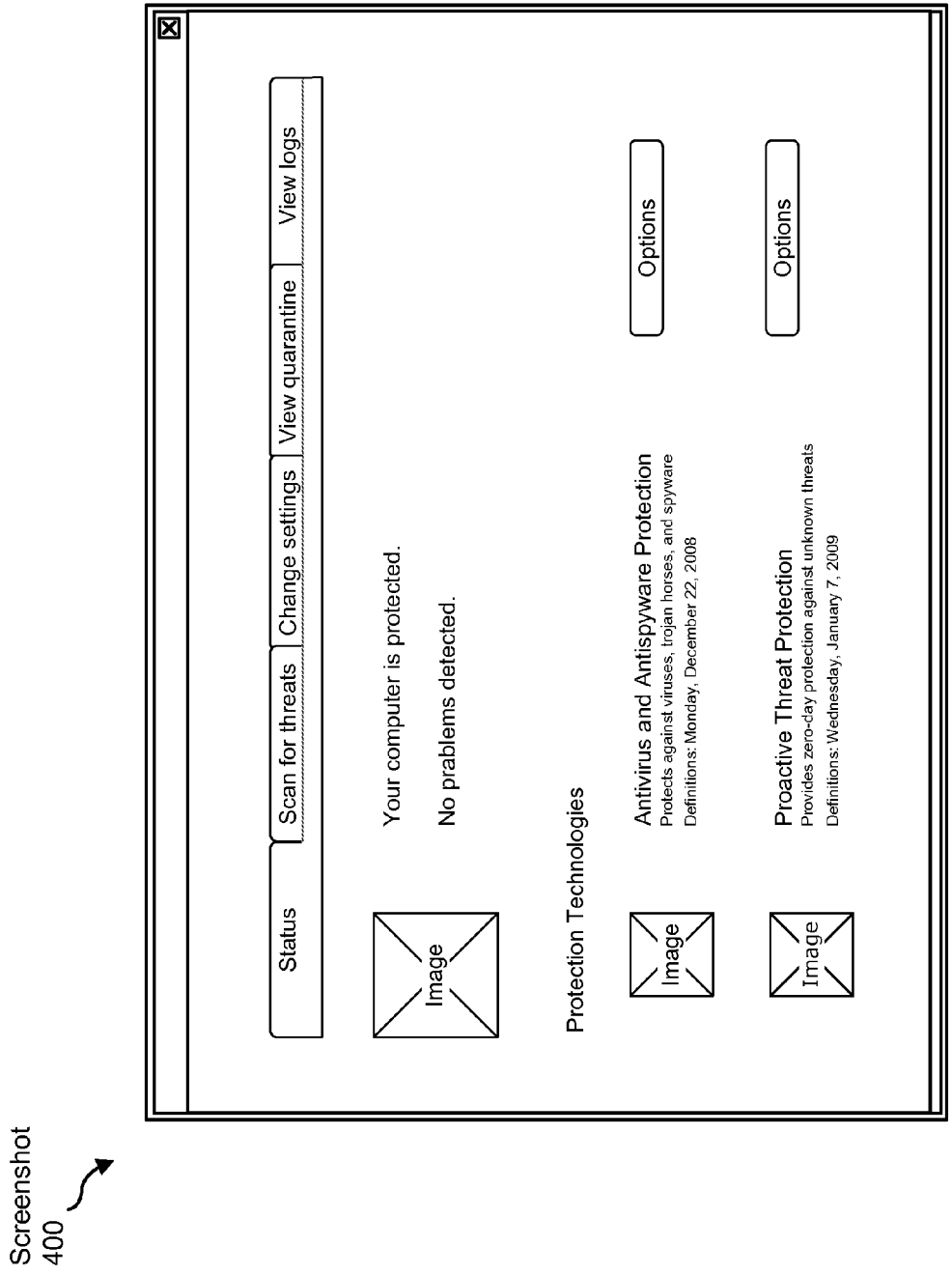
FIG. 4 is an illustration of an exemplary screenshot.
Figure 5:
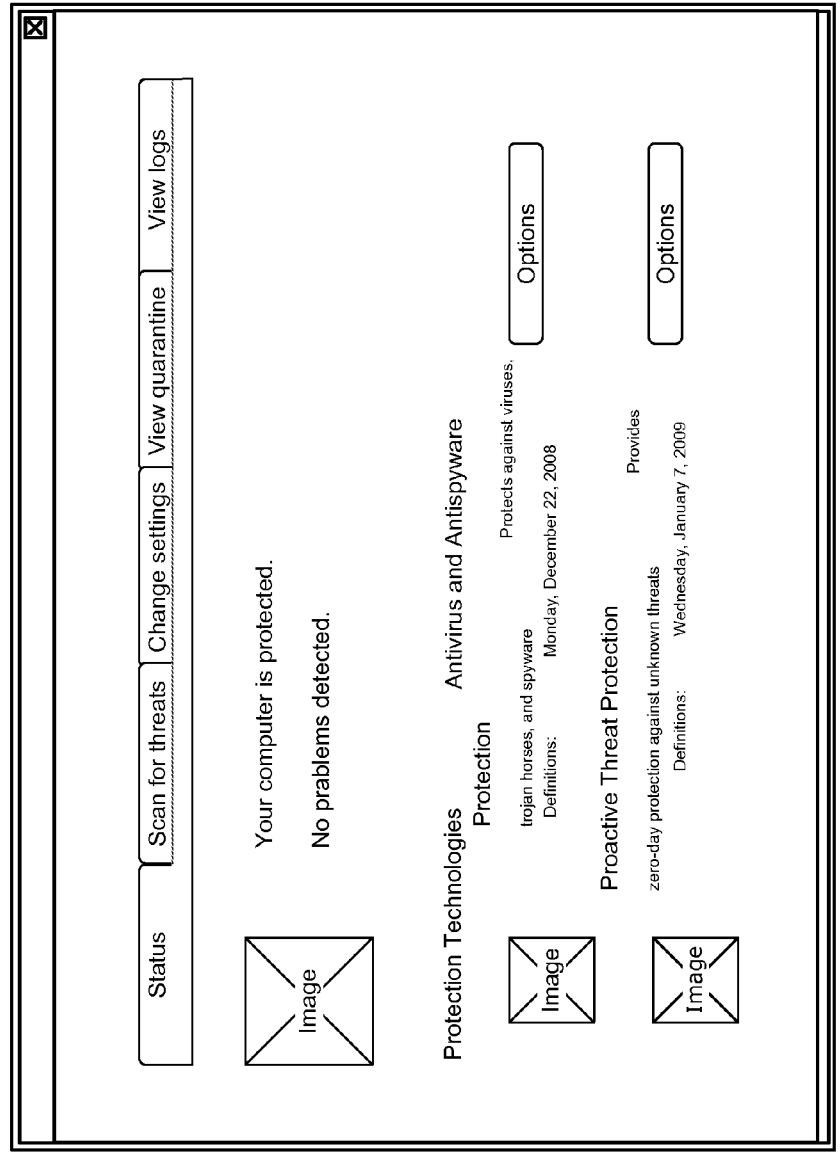
FIG. 5 is an illustration of an additional exemplary screenshot.
Figure 6:
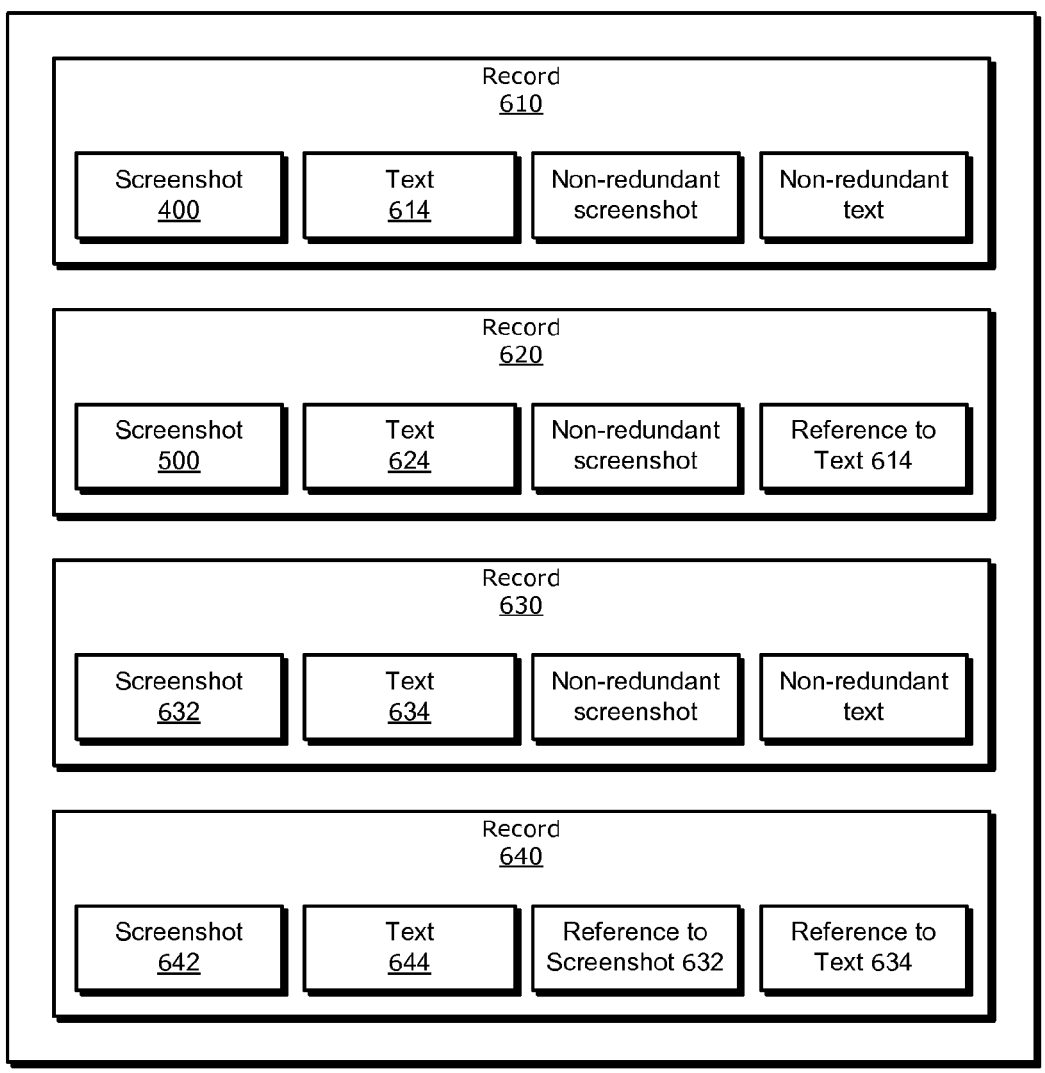
FIG. 6 is an illustration of an exemplary database.

For the sake of clarity, and by way of example only, the following will describe, with reference to FIGS. 4-6, an exemplary implementation of exemplary method 300 in FIG. 3. In this example, FIG. 4 illustrates an exemplary screenshot 400 taken of a graphical user interface in a first state, FIG. 5 illustrates an exemplary screenshot 500 taken of this graphical user interface in a second, different state, and FIG. 6 illustrates an exemplary implementation of database 120 containing records corresponding to screenshots 400 and 500 in FIGS. 4 and 5.

In this example, consolidation module 112 may capture screenshots 400 and 500 while interacting with the user interface. Consolidation module 112 may then extract text contained in both screenshot 400 and screenshot 500, respectively, by collecting the text from data structures in the operating environment that may be used to render the graphical user interface and/or by applying an optical character recognition method to the screenshots. Consolidation module 112 may then store screenshot 400 and its corresponding text 614 in a record 610 of database 120, as illustrated in FIG. 6. Consolidation module 112 may also store screenshot 500 and its corresponding text 624 in a record 620 of database 120. In some embodiments, consolidation module 112 may store a copy of each screenshot and each set of text within database 120. In other embodiments, consolidation module 112 may simply store a link to the location of each screenshot and set of text.

Consolidation module 112 may then generate fingerprints for each of screenshot 400, text 614, screenshot 500, and text 624, respectively. Consolidation module 112 may then determine, by comparing the fingerprint of screenshot 400 with the fingerprint of screenshot 500, that these two screenshot fingerprints are not identical since, as illustrated in FIGS. 4 and 5, the formatting of the text contained in screenshot 500 in FIG. 5 is slightly distorted.

Similarly, consolidation module 112 may determine, by comparing the fingerprint of text 614 with the fingerprint of text 624, that these two text fingerprints are identical since, as illustrated in FIGS. 4 and 5, the text contained in screenshots 400 and 500 are identical (albeit slightly distorted in screenshot 500). Accordingly, consolidation module 112 may: 1) mark text 624 as redundant by placing a reference to text 614 in record 620 in database 120 and 2) mark text 614 as non-redundant by making an entry in record 610. In some embodiments, consolidation module 112 may store each generated screenshot and text fingerprint with their associated records in database 120.

Continuing with the example illustrated in FIGS. 4-6, consolidation module 112 may also determine, by comparing the fingerprint of a third screenshot 632 of the user interface with the fingerprint of a fourth screenshot 642 of the user interface, that these third and fourth screenshots are identical. Accordingly, consolidation module 112 may mark both screenshot 642 and text 644 contained within record 640 as redundant, since identical screenshots may imply identical sets of text contained within the screenshots. In this example, consolidation module 112 may mark screenshot 642 and text 644 as redundant by placing both a reference to screenshot 632 and a reference to text 634 in record 640. Consolidation module 112 may then mark screenshot 632 and text 634 as non-redundant by making entries in record 630.

Display module 114 may then analyze database 120 to determine which screenshots to display to which users. For example, display module 114 may, by analyzing records 610, 620, 630, and 640, determine that screenshots 400, 500, and 632 are non-redundant. Display module 114 may then display these non-redundant screenshots to at least one user (e.g., a user, such as a quality-assurance engineer, of computing subsystem 222 in FIG. 2) tasked with identifying any cosmetic and/or functional errors within the graphical user interface (such as the formatting irregularities present in screenshot 500).

Similarly, display module 114 may, by analyzing records 610, 620, 630, and 640, determine that text 614 and 634 are non-redundant. Display module 114 may then display these non-redundant sets of text to at least one user (e.g., a user, such as a linguistic reviewer, of computing subsystem 224 in FIG. 2) tasked with identifying any spelling, grammatical, semantic, or translation errors within the graphical user interface (such as the misspelling of "problems" in screenshots 400 and 500).

Embodiments of the instant disclosure may provide various features and advantages not provided by traditional quality-assurance technologies. For example, by identifying visual and/or textual redundancies present in a graphical user interface and only presenting non-redundant information for review, the systems and methods disclosed herein may greatly reduce both the cost and time required to perform a thorough quality-assurance review of a user interface.

Figure 7:
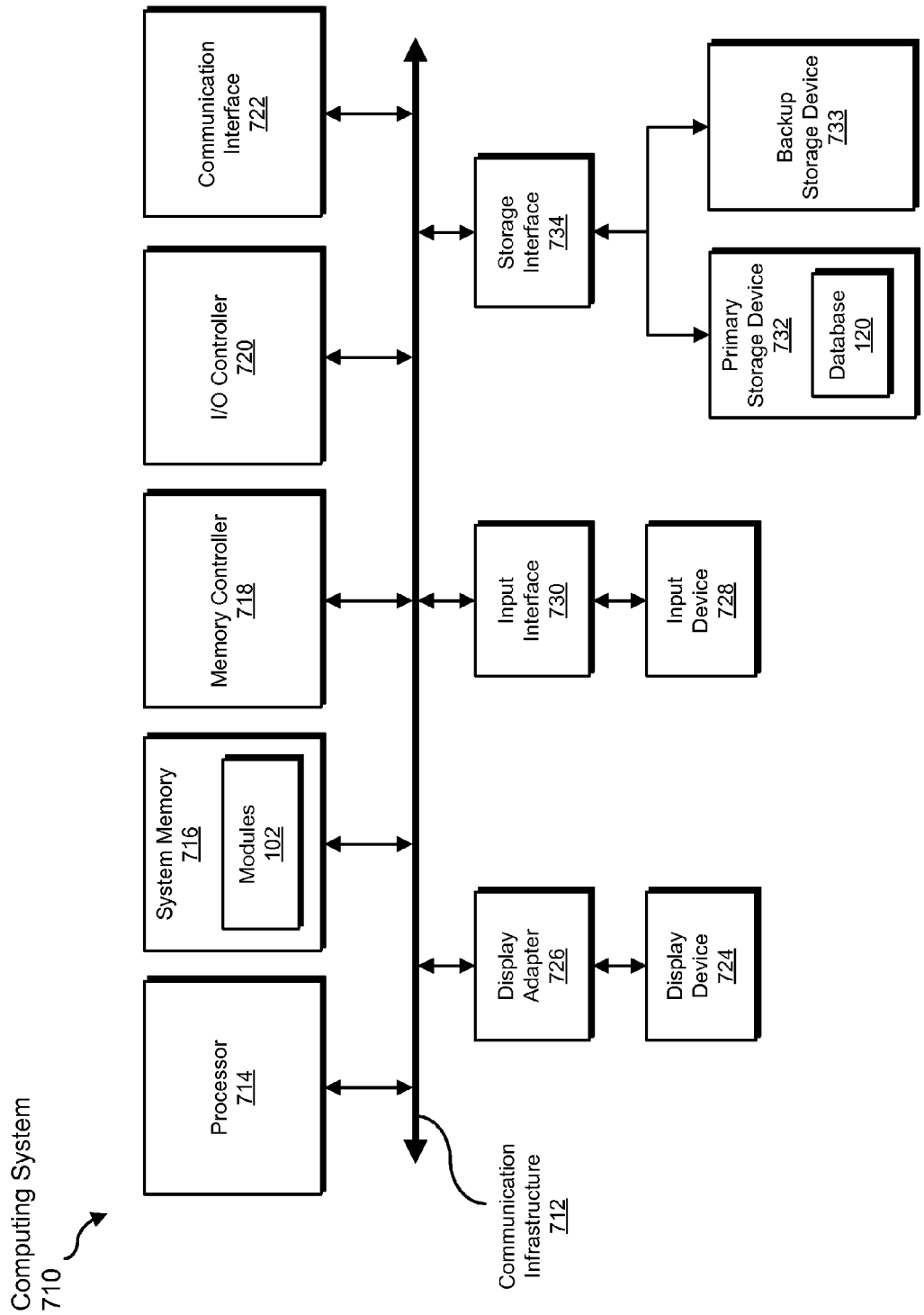
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, creating, performing, displaying, determining, and/or excluding steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions.

Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as identifying, creating, performing, displaying, determining, and/or excluding.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, creating, performing, displaying, determining, and/or excluding steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 794 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, creating, performing, displaying, determining, and/or excluding steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, creating, performing, displaying, determining, and/or excluding steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the identifying, creating, performing, displaying, determining, and/or excluding steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
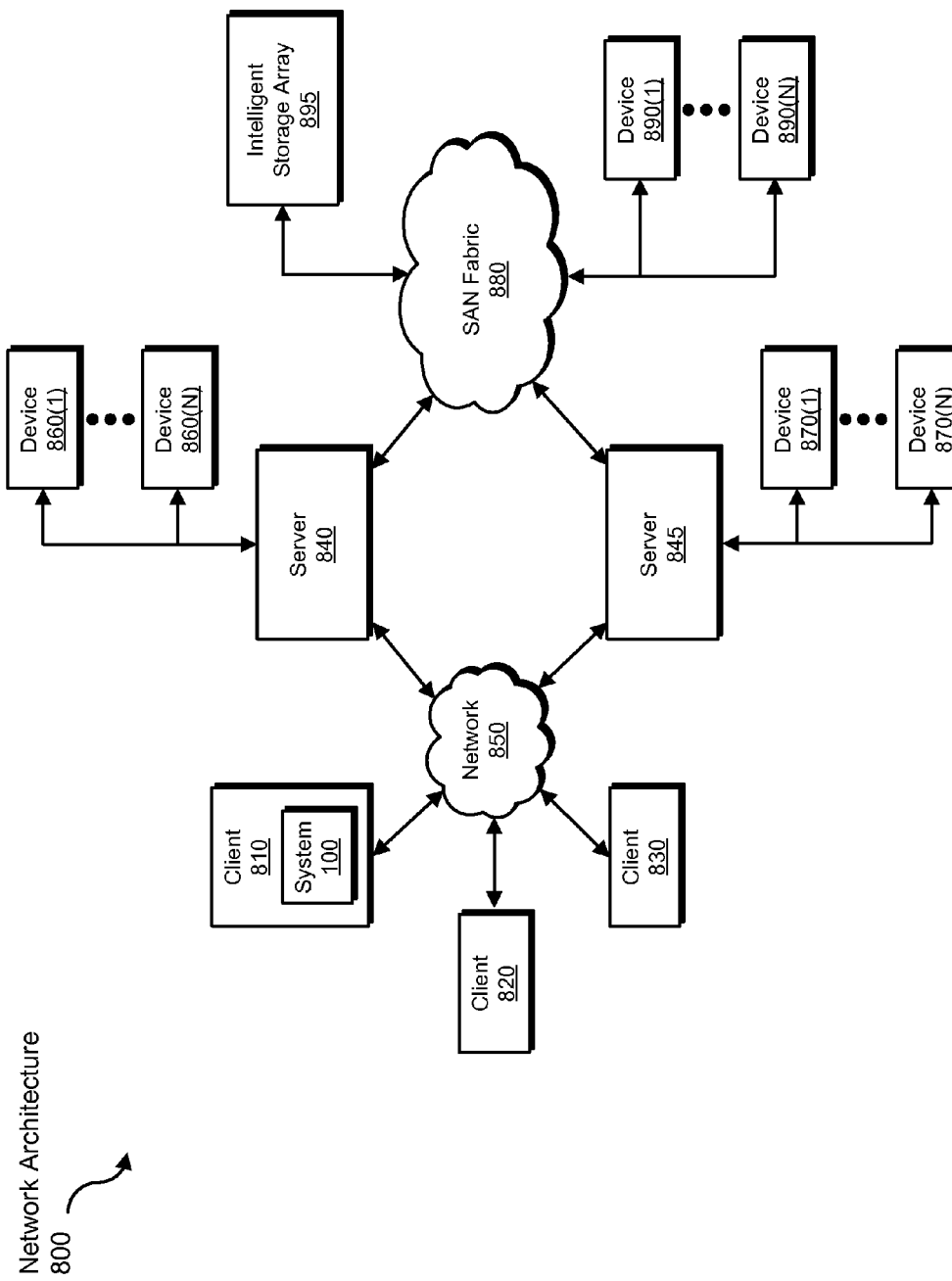
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. In one example, client system 810 may comprise system 100 from FIG. 1.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, creating, performing, displaying, determining, and/or excluding steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for reducing redundancies in quality-assurance reviews of graphical user interfaces. For example, a computing system may identify a plurality of screenshots of a graphical user interface. The computing system may also create, for each screenshot within the plurality of screenshots: 1) a fingerprint of the screenshot and 2) a fingerprint of a set of text contained within the screenshot. The computing system may further perform a consolidation operation that identifies, by comparing each screenshot fingerprint and comparing each text fingerprint, redundant screenshots and/or redundant sets of text. The computing system may additionally display non-redundant screenshots and/or non-redundant sets of text.

In various embodiments, the consolidation operation may include identifying a first screenshot fingerprint corresponding to a first screenshot within the plurality of screenshots, identifying at least one additional screenshot fingerprint corresponding to an additional screenshot within the plurality of screenshots, and determining that the first screenshot fingerprint is identical to the additional screenshot fingerprint. In certain embodiments, the consolidation operation may further include marking the additional screenshot as redundant. In some embodiments, marking the additional screenshot as redundant may include: 1) creating, in a database record associated with the additional screenshot, a reference to the first screenshot, 2) creating, in the database record associated with the additional screenshot, a reference to a set of text contained within the first screenshot, and 3) excluding the additional screenshot fingerprint from further comparison.

In various embodiments, the consolidation operation may include identifying a first text fingerprint corresponding to a set of text contained within a first screenshot within the plurality of screenshots, identifying at least one additional text fingerprint corresponding to a set of text contained within an additional screenshot within the plurality of screenshots, and determining that the first text fingerprint is identical to the additional text fingerprint. In certain embodiments, the consolidation operation may further include marking a set of text contained within the additional screenshot as redundant. In some embodiments, marking the set of text contained within the additional screenshot as redundant may include: 1) creating, in a database record associated with the additional screenshot, a reference to a set of text contained within the first screenshot and 2) excluding the additional text fingerprint from further comparisons.

In some embodiments, the computing system may also identify the non-redundant screenshots by analyzing database records associated with the plurality of screenshots. In some embodiments, the computing system may identify the non-redundant sets of text by analyzing database records associated with the plurality of screenshots.

According to various embodiments, displaying the non-redundant screenshots may include displaying the non-redundant screenshots to at least one user tasked with identifying any cosmetic errors and/or any functional errors within the graphical user interface. According to certain embodiments, displaying the non-redundant sets of text may include displaying the non-redundant sets of text to at least one user tasked with identifying any spelling errors within the graphical user interface, any grammatical errors within the graphical user interface, any semantic errors within the graphical user interface, and/or any translation errors within the graphical user interface.

In some embodiments, identifying the plurality of screenshots may include creating the plurality of screenshots and/or retrieving the plurality of screenshots from a database. According to some embodiments, creating the plurality of screenshots may include capturing the plurality of screenshots from an operating environment associated with the graphical user interface and, for each screenshot within the plurality of screenshots, extracting a set of text from the screenshot by applying optical character recognition to the screenshot and/or collecting the set of text from the operating environment. In certain embodiments, creating, for each screenshot within the plurality of screenshots, the fingerprint of the screenshot may include applying a cryptographic hash function to a bitmap of the screenshot.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for reducing redundancies in quality-assurance reviews of graphical user interfaces, at least a portion of the method being performed by a computing device comprising at least one processor, the method comprising:

identifying a plurality of screenshots of a graphical user interface, wherein each screenshot within the plurality of screenshots represents a possible state of the graphical user interface;

creating, for each screenshot within the plurality of screenshots:
- a fingerprint that uniquely identifies the screenshot by generating a cryptographic hash of the screenshot;
- a fingerprint that uniquely identifies a set of text contained within the screenshot by generating a cryptographic hash of the set of text contained within the screenshot;

performing a consolidation operation that identifies, by comparing each screenshot fingerprint and each text fingerprint, at least one of:
- redundant screenshots within the plurality of screenshots;
- redundant sets of text within the plurality of screenshots;

displaying, during a quality-assurance review of the graphical user interface administered by a quality-assurance engineer, only:
- non-redundant screenshots contained within the plurality of screenshots; and
- non-redundant sets of text contained within the plurality of screenshots.

2. The computer-implemented method of claim 1, wherein the consolidation operation comprises:
- identifying a first screenshot fingerprint corresponding to a first screenshot within the plurality of screenshots;
- identifying at least one additional screenshot fingerprint corresponding to an additional screenshot within the plurality of screenshots;
- determining that the first screenshot fingerprint is identical to the additional screenshot fingerprint.

3. The computer-implemented method of claim 2, wherein the consolidation operation further comprises marking the additional screenshot as redundant.

4. The computer-implemented method of claim 3, wherein marking the additional screenshot as redundant comprises:
- creating, in a database record associated with the additional screenshot, a reference to the first screenshot;
- creating, in the database record associated with the additional screenshot, a reference to a set of text contained within the first screenshot;
- excluding the additional screenshot fingerprint from further comparisons.

5. The computer-implemented method of claim 1, wherein the consolidation operation comprises:
- identifying a first text fingerprint corresponding to a set of text contained within a first screenshot within the plurality of screenshots;
- identifying at least one additional text fingerprint corresponding to a set of text contained within an additional screenshot within the plurality of screenshots;
- determining that the first text fingerprint is identical to the additional text fingerprint.

6. The computer-implemented method of claim 5, wherein the consolidation operation further comprises marking the set of text contained within the additional screenshot as redundant.

7. The computer-implemented method of claim 6, wherein marking the set of text contained within the additional screenshot as redundant comprises:
- creating, in a database record associated with the additional screenshot, a reference to the set of text contained within the first screenshot;
- excluding the additional text fingerprint from further comparisons.

8. The computer-implemented method of claim 1, further comprising identifying the non-redundant screenshots by analyzing database records associated with the plurality of screenshots.

9. The computer-implemented method of claim 1, further comprising identifying the non-redundant sets of text by analyzing database records associated with the plurality of screenshots.

10. The computer-implemented method of claim 1, wherein displaying the non-redundant screenshots comprises displaying the non-redundant screenshots to at least one quality-assurance engineer tasked with identifying at least one of:
- any cosmetic errors within the graphical user interface;
- any functional errors within the graphical user interface.

11. The computer-implemented method of claim 1, wherein displaying the non-redundant sets of text comprises displaying the non-redundant sets of text to at least one quality-assurance engineer tasked with identifying at least one of:
- any spelling errors within the graphical user interface;
- any grammatical errors within the graphical user interface;
- any semantic errors within the graphical user interface;
- any translation errors within the graphical user interface.

12. The computer-implemented method of claim 1, wherein identifying the plurality of screenshots comprises at least one of:
- creating the plurality of screenshots;
- retrieving the plurality of screenshots from a database.

13. The computer-implemented method of claim 12, wherein creating the plurality of screenshots comprises:
- capturing the plurality of screenshots from an operating environment associated with the graphical user interface;
- for each screenshot within the plurality of screenshots, at least one of:
  - extracting a set of text from the screenshot by applying optical character recognition to the screenshot;
  - collecting the set of text from the operating environment.

14. A system for reducing redundancies in quality-assurance reviews of graphical user interfaces, the system comprising:
a consolidation module programmed to:
- identify a plurality of screenshots of a graphical user interface, wherein each screenshot within the plurality of screenshots represents a possible state of the graphical user interface;
- create, for each screenshot within the plurality of screenshots:
  - a fingerprint that uniquely identifies the screenshot by generating a cryptographic hash of the screenshot;
  - a fingerprint that uniquely identifies a set of text contained within the screenshot by generating a cryptographic hash of the set of text contained within the screenshot;
- perform a consolidation operation that identifies, by comparing each screenshot fingerprint and comparing each text fingerprint, at least one of:
  - redundant screenshots within the plurality of screenshots;
  - redundant sets of text within the plurality of screenshots;
a display module programmed to display, during a quality-assurance review of the graphical user interface administered by a quality-assurance engineer, only:
- non-redundant screenshots contained within the plurality of screenshots; and non-redundant sets of text contained within the plurality of screenshots;
a database for storing the plurality of screenshots;
at least one hardware-based processor configured to execute the consolidation module and the display module.

15. The system of claim 14, wherein the consolidation operation comprises:
identifying a first screenshot fingerprint corresponding to a first screenshot within the plurality of screenshots;
identifying at least one additional screenshot fingerprint corresponding to an additional screenshot within the plurality of screenshots;
determining that the first screenshot fingerprint is identical to the additional screenshot fingerprint.

16. The system of claim 15, wherein the consolidation operation further comprises marking the additional screenshot as redundant.

17. The system of claim 16, wherein the consolidation module is programmed to mark the additional screenshot as redundant by:
creating, in a database record associated with the additional screenshot, a reference to the first screenshot;
creating, in the database record associated with the additional screenshot, a reference to a set of text contained within the first screenshot;
excluding the additional screenshot fingerprint from further comparisons.

18. The system claim 14, wherein the consolidation operation comprises:
identifying a first text fingerprint corresponding to a set of text contained within a first screenshot within the plurality of screenshots;
identifying at least one additional text fingerprint corresponding to a set of text contained within an additional screenshot within the plurality of screenshots;
determining that the first text fingerprint is identical to the additional text fingerprint.

19. A non-transitory computer-readable-storage medium comprising one or more computer-executable instructions that, when executed by a computing device, cause the computing device to:
identify a plurality of screenshots of a graphical user interface, wherein each screenshot within the plurality of screenshots represents a possible state of the graphical user interface;
create, for each screenshot within the plurality of screenshots:
a fingerprint that uniquely identifies the screenshot by generating a cryptographic hash of the screenshot;
a fingerprint that uniquely identifies a set of text contained within the screenshot by generating a cryptographic hash of the set of text contained within the screenshot;
perform a consolidation operation that identifies, by comparing each screenshot fingerprint and comparing each text fingerprint, at least one of:
redundant screenshots within the plurality of screenshots;
redundant sets of text within the plurality of screenshots;
display, during a quality-assurance review of the graphical user interface administered by a quality-assurance engineer, only:
non-redundant screenshots contained within the plurality of screenshots; and
non-redundant sets of text contained within the plurality of screenshots.

\* \* \* \* \*